United States Patent [19]
Nozaki et al.

[11] Patent Number: 5,111,750
[45] Date of Patent: May 12, 1992

[54] CONVEYOR SYSTEM

[75] Inventors: Yoshihisa Nozaki, Toyokawa; Takashi Inden, Nagoya, both of Japan

[73] Assignee: Brother Kogyo Kabushiki Kaisha, Aichi, Japan

[21] Appl. No.: 556,736

[22] Filed: Jul. 20, 1990

[30] Foreign Application Priority Data

Jul. 21, 1989 [JP] Japan ................... 1-191612

[51] Int. Cl.$^5$ ............................... B61J 1/00
[52] U.S. Cl. .......................... 104/88; 104/99; 104/89; 104/91; 104/172.4
[58] Field of Search ............ 104/35, 96, 99, 111, 104/89, 91, 88, 172.2, 172.4; 198/465.1, 465.2, 465.4, 346.1, 346.2

[56] References Cited

U.S. PATENT DOCUMENTS

| | | | |
|---|---|---|---|
| 386,872 | 7/1888 | Ellis | 104/199 |
| 582,436 | 5/1897 | Ridgway | 104/99 |
| 988,276 | 3/1911 | McLaren | 104/99 |
| 1,403,853 | 1/1922 | Ferris | 104/99 |
| 1,684,986 | 9/1928 | Gillies | 104/99 |
| 3,104,621 | 9/1963 | Withers | 104/99 |
| 3,307,720 | 3/1967 | Davis et al. | 198/465.4 |
| 3,530,571 | 9/1970 | Perry | 198/465.2 |
| 3,592,141 | 7/1971 | Davidson . | |
| 3,747,537 | 7/1973 | Matsumoto et al. | 104/88 |
| 4,291,797 | 9/1981 | Ewertowski | 198/465.1 |
| 4,326,624 | 4/1982 | Ewertowski et al. | 104/88 |
| 4,552,072 | 11/1985 | Kardinal et al. | 104/88 |
| 4,597,495 | 7/1986 | Kosby | 104/88 |

FOREIGN PATENT DOCUMENTS

| | | |
|---|---|---|
| 2309939 | 2/1973 | Fed. Rep. of Germany ........ 104/99 |
| 1409391 | 10/1975 | United Kingdom . |
| 2021500 | 12/1979 | United Kingdom ............ 104/172.4 |
| 2064454 | 6/1981 | United Kingdom ................ 104/99 |
| 2089752 | 6/1982 | United Kingdom . |
| 2121366B | 12/1983 | United Kingdom . |
| 2106465B | 9/1984 | United Kingdom . |

OTHER PUBLICATIONS

PCT International Appl. No. PCT/US88/00964, Nov. 5, 1987.

Primary Examiner—Robert J. Oberleitner
Assistant Examiner—Mark T. Le
Attorney, Agent, or Firm—Kane, Dalsimer, Sullivan, Kurucz, Levy, Eisele and Richard

[57] ABSTRACT

In a conveyor system for conveying a carrier member supporting a workpiece among working stations, provided are course changing units for changing the course through which the carrier member is conveyed, each of the course changing units being formed with a plurality of connecting portions, a pair of first conveying devices for conveying the carrier member between two of the course changing units, one and the other ends of each pair of first conveying devices being connected with ones of the connecting portions of different ones of the course changing units, respectively, each one of the pairs of first conveying devices conveying the carrier member in reverse direction with respect to each other, and second conveying devices for conveying the carrier member between one of the working stations and the course changing units. The carrier member having been conveyed through one of the first and second conveying devices is directed to another one of the first and second conveying devices by the course changing units.

10 Claims, 9 Drawing Sheets

CONVEYOR SYSTEM

BACKGROUND OF THE INVENTION

The present invention relates to a conveyer system for conveying a carrier member which is carrying a workpiece among working stations.

Conventionally, a conveyer system for transferring carrier members such as hangers which hold a workpiece such as a sewing product in a sewing plant and the like has been known. For example, in a conveyor system endless main lines 66 are connected with a large number of sub-lines 65 each of which is provided with working stations such as sewing stations, each end of the main lines 66 being connected to a connection line 67 which is also formed to be endless, a carrier member which carries a workpiece being transferred from one sub-line 65 to another sub-line 65 along the main line 66 and the connection line 67 (refer to FIG. 1). (For example, see U.S. Pat. No. 3,592,141).

In the meantime, in many production fields including the sewing field, it is required that the layout of the conveyer system is flexibly modified or expanded in the plant because of the change of producing process. In addition, the carrier member is also required to be transferred to an objective station through the shortest route.

In the conventional structure described above, however, since the sub-lines 65 which are provided with working stations are connected with each other through the endless main line 66 and the connection line 67, the layout cannot be flexibly changed and expanded as desired.

As shown in FIG. 1, in the conventional conveyer system, each sub-line 65 is arranged in parallel around the main line 66, and each main line 66 is arranged in parallel around the connection line 67. Thus, the sub-lines 65, or the working stations cannot be flexibly networked. Moreover, as shown by two-dot lines in FIG. 1, when an another main line 66 which is provided with a plurality of sub-lines 65 is built, a very complicated work is required, that is, one end of the endless connection line 67 should be cut; new chains and rails should be additionally connected in order to stretch the entire system; and struts and fasteners which support the connection line 67 should be added.

In addition, during the construction period when the mainline 66 is expanded, for example, since the connection line 67 should be cut and inoperative, the entire operation of the conveyer system should be halted. To prevent that, conventionally, the facilities are built with estimating the future expansion, which results in losses of the investment, construction time period, and running cost.

Moreover, since each main line 66 and the connection line 67 always run in a single direction, two working stations on different two sub-lines 65 cannot be connected through the shortest route. Therefore, the hanger cannot be transferred to the objective working station in a short time.

In FIG. 1, for example, although the working station A on the sub-line 65 is close to the station B or the station C on the same sub-line 65, the hanger can not be directly transferred from the station A to the station B or the station C along the arrow D or E. Instead, as shown by the arrow F, the hanger should be conveyed through a roundabout way, thereby it takes relatively a long time.

Especially when the hanger is conveyed between working stations on different main lines 66, 66, such a problem is highlighted. For example, when the hanger is conveyed from the working station A on the sub-line 65 to a station G on the sub-line 65, it should be conveyed all the way along an arrow H, an arrow G, an arrow I, and an arrow J.

SUMMARY OF THE INVENTION

It is therefore an object of the invention to provide an improved conveyer system which layout can be flexibly modified or expanded and capable of conveying a carrier member supporting a workpiece through the relatively short route in a short period of time.

For the above objects, according to the invention, there is provided a conveyer system for conveying a carrier member supporting a workpiece among working stations, comprising:
   a plurality of course changing means for changing a conveying course through which said carrier member is to be conveyed;
   at least one pair of first conveying means for conveying said carrier member between two course changing means, one and the other ends of each pair of first conveying means being connected with different ones of said course changing means, respectively, each one of said pairs of first conveying means conveying said carrier member in opposite direction with respect to each other; and
   at least one second conveying means for conveying said carrier member between said working station and said course changing means, whereby said carrier member conveyed through one of said first and second conveying means is directed to another one of said first and second conveying means by said course changing means.

In the conveyer system constructed as above, by connecting a plurality of course changing units having intermediate rails and station rails, the conveyer system can be freely and flexibly laid out. Further, the layout of the conveyer system can be flexibly modified or expanded. Furthermore, with this conveyer system, since the course changing unit allocates the carrier member in a desired direction, the carrier member can be transferred to a destination through the shortest route in a relatively short time.

DESCRIPTION OF THE ACCOMPANYING DRAWINGS

DESCRIPTION OF THE EMBODIMENTS

Figure 1:
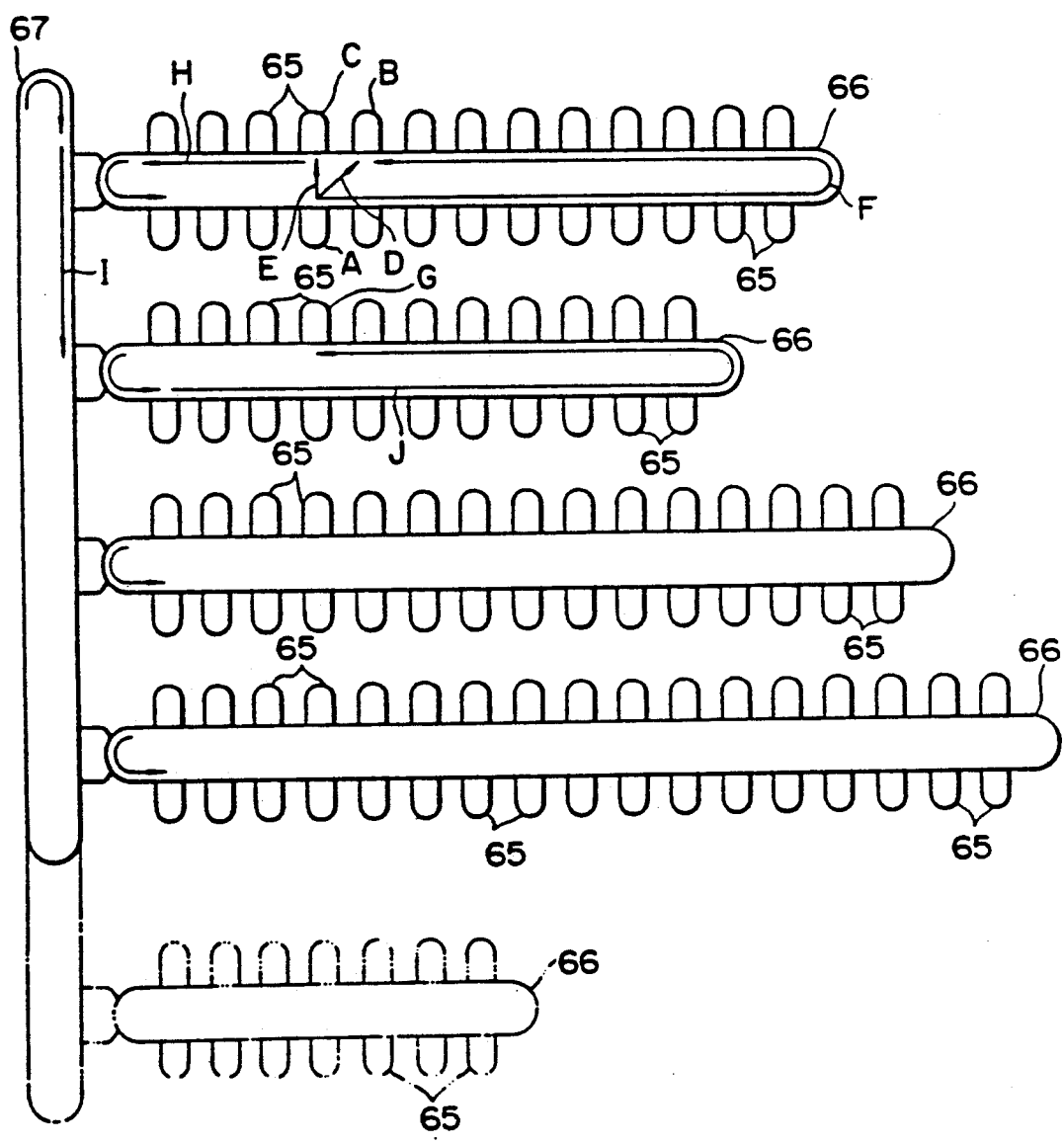
FIG. 1 is a schematic plan view of a conventional conveyer system.

As shown in FIGS. 2 to 6, course changing units 1 are disposed with a certain interval between each other in a sewing plant or the like. Each course changing unit 1 is provided with a post 3 vertically disposed on a floor 2 (see FIG. 3). A mounting table 5 is secured at the top of the post 3, on which a supporting shaft 4 is vertically disposed. A supporting plate 6 is mounted on the top of the supporting shaft 4. A rectangular-frame-shaped supporting frame 7a for supporting a station rail 11 is securely supported on the upper surface of the supporting plate 6 at the middle section thereof. A pair of frames 7b arranged in parallel for supporting an intermediate rail 10 are stretched between the supporting plates 6, 6 of the course changing units 1, 1 and both ends of the pair of frames 7b, 7b are securely mounted on the supporting plates 6, 6 of the course changing units 1, 1, respectively.

A hanger rail 8 is provided with a pair of intermediate rails 10 arranged in parallel and interposed between the course changing units 1, 1, which is suspended from the frame 7a and the frame 7b with a plurality of metal fittings 9, a plurality of U-shaped station rails 11 for working stations ST1, ST2, ST3, ST4, . . . which are to be arranged in the vicinity of the course changing unit 1. Receiving sections 10a and 11a, and sending sections 10b and 11b are formed at both ends of the intermediate rail 10 and the station rail 11. The receiving sections 10a, 11a, and the sending sections 10b, 11b are arranged at the same height in the vicinity of the course changing unit 1 at predetermined angular intervals (in the present embodiment, at angular intervals of 45 degrees). The working stations ST1, ST2, . . . consist of, for example, sewing units provided with sewing machines and the like disposed under the station rail 11.

Figure 3:
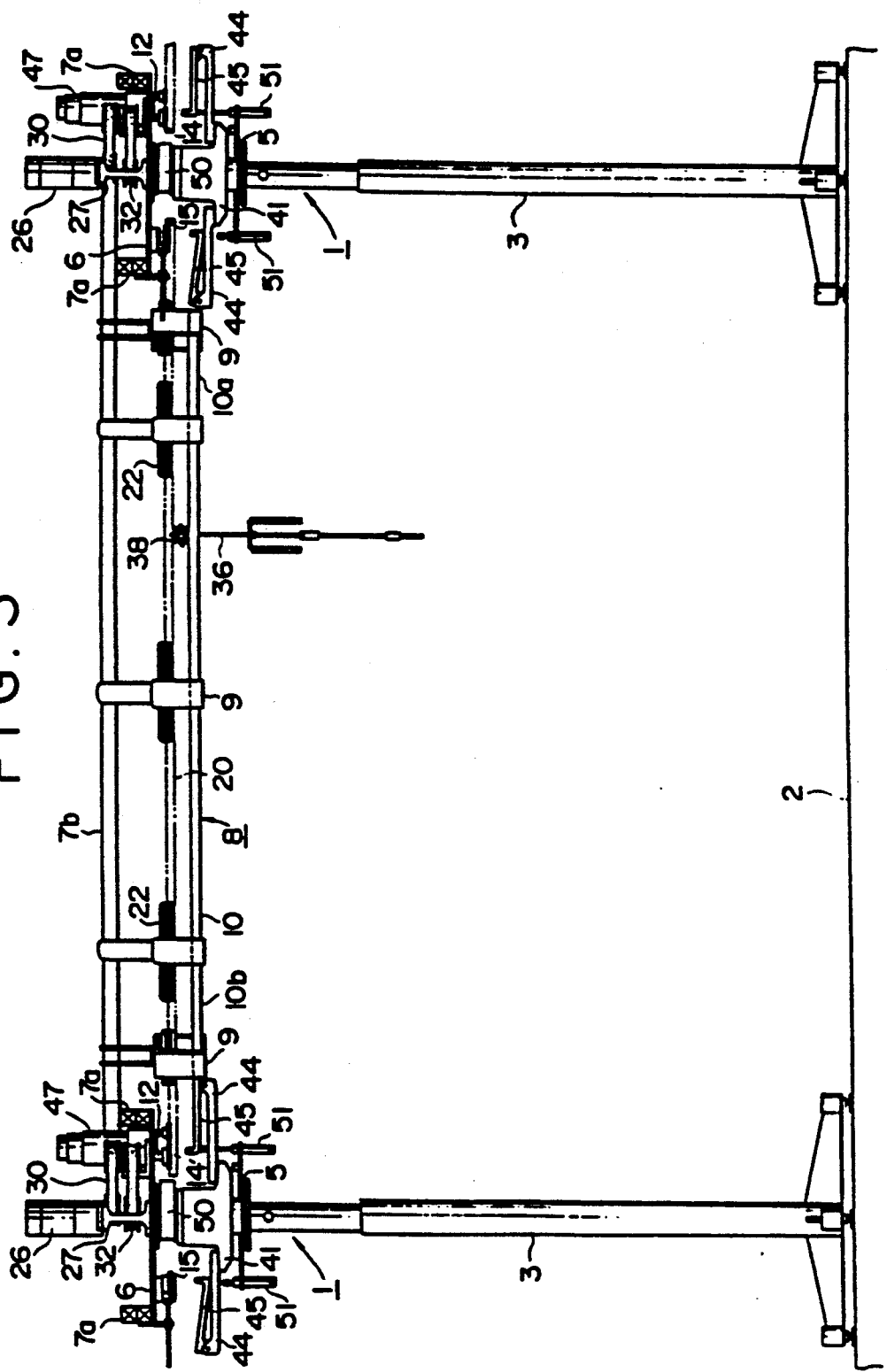
FIG. 3 is a partial side view of FIG. 2.
Figure 4:
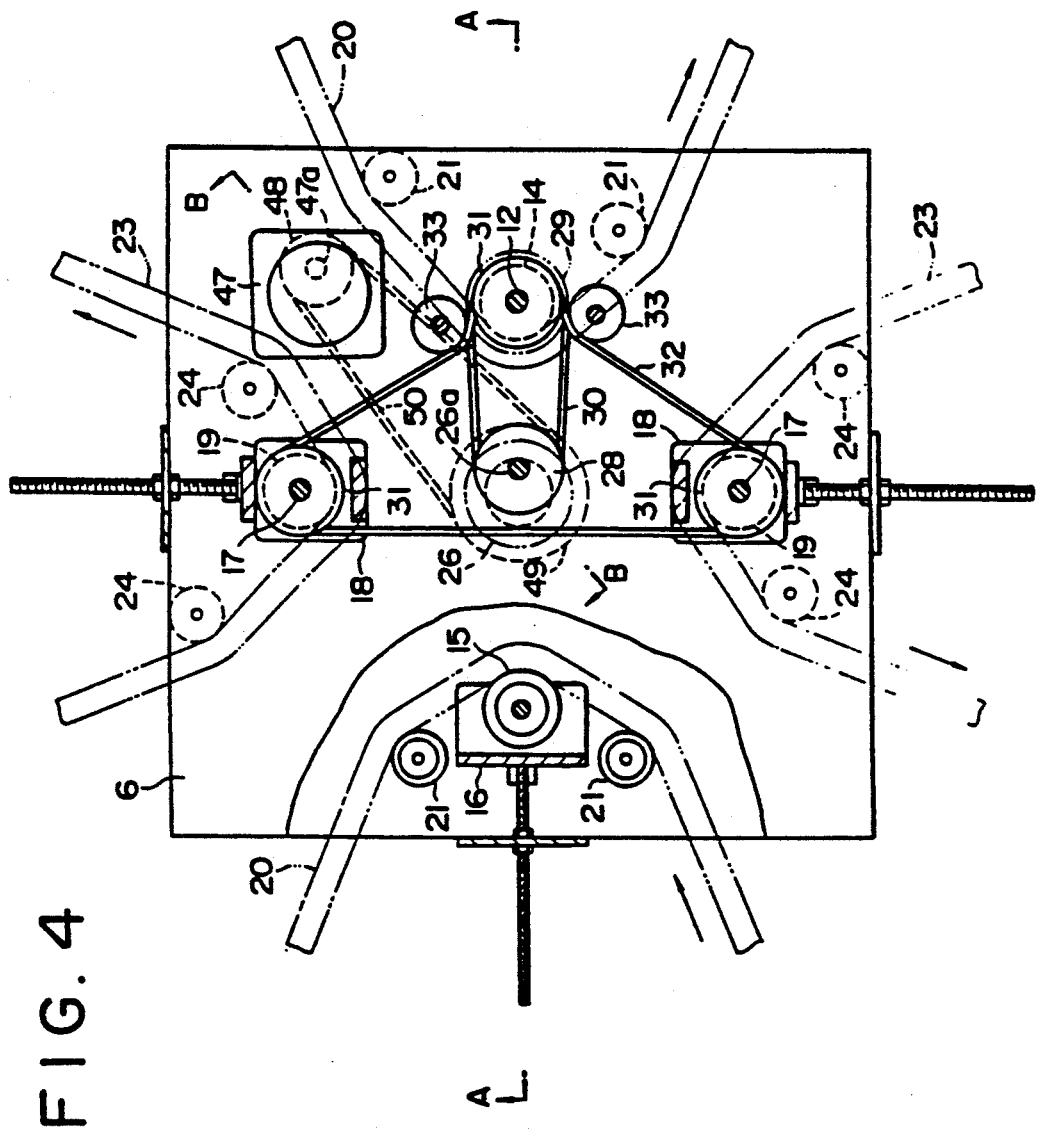
FIG. 4 is an enlarged partial sectional view showing a drive mechanism of a course changing unit.
Figure 5:
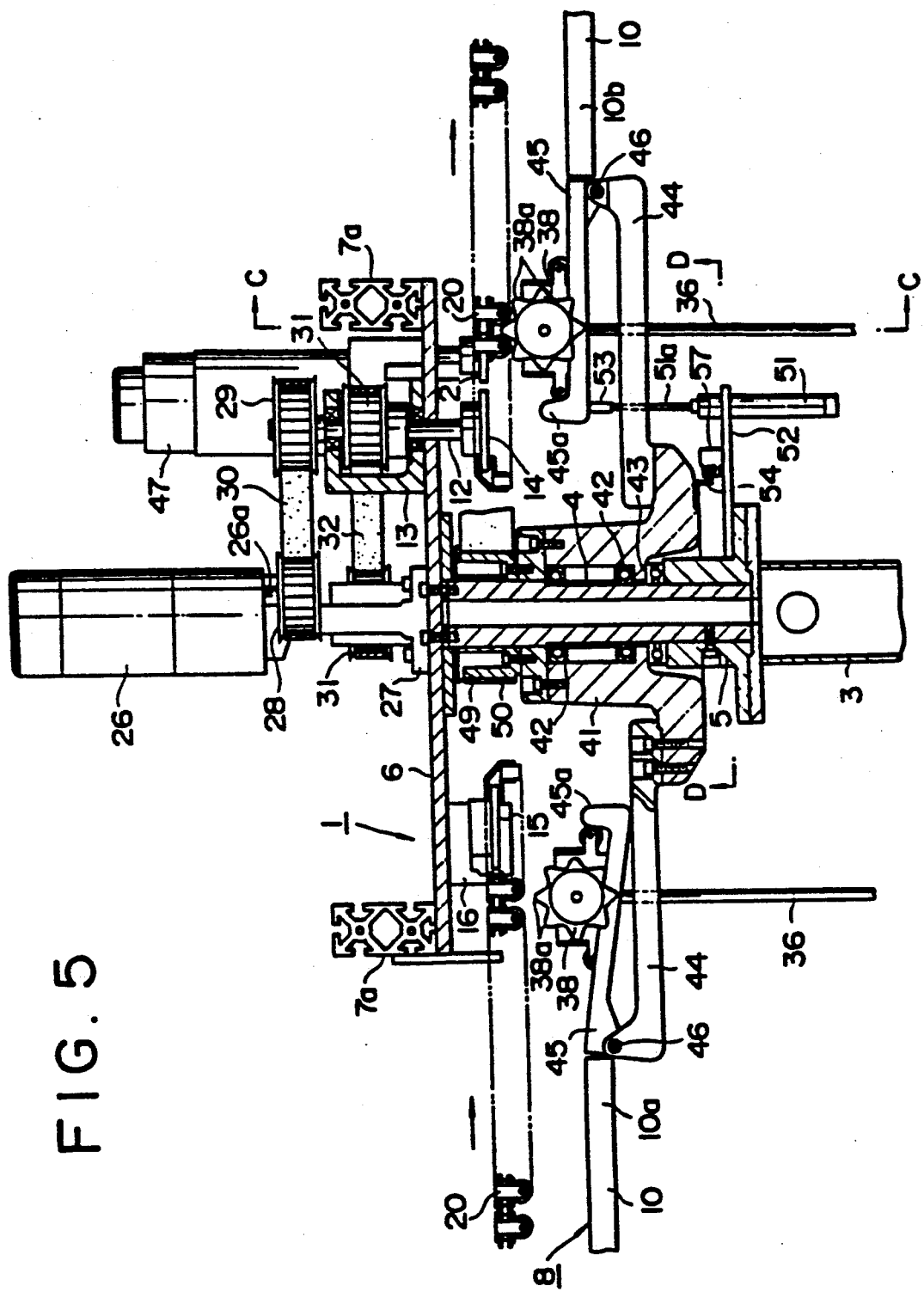
FIG. 5 is a partial sectional view taken from line A—A of FIG. 4.
Figure 6:
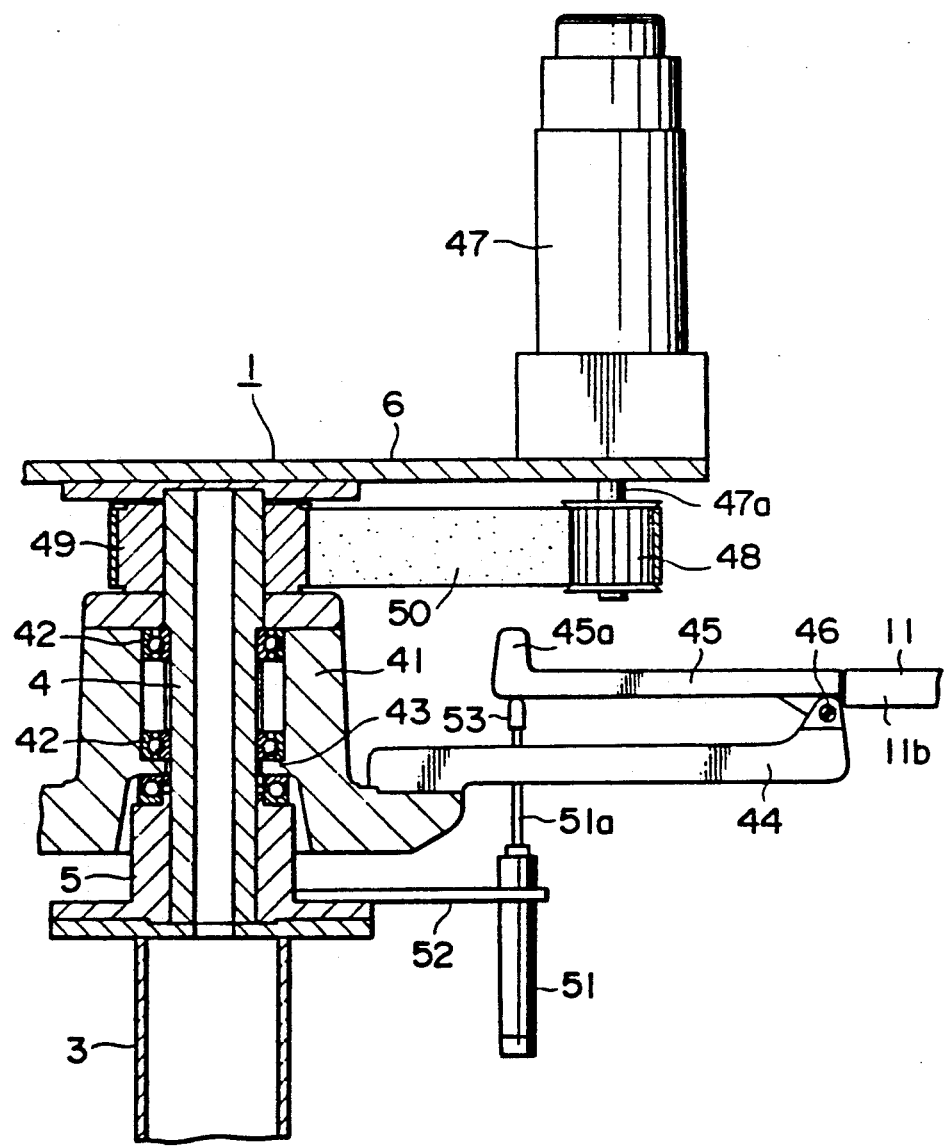
FIG. 6 is a partial sectional view taken from line B—B of FIG. 4.

As shown in FIGS. 3 to 5, a rotating shaft 12 is rotatably supported by and engaged with the supporting plate 6 of the course changing unit 1 by means of a fixing bracket 13, the rotating shaft 12 being engaged with the fixing bracket 13. A driving sprocket 14 is fixed to the lower end of the rotating shaft 12. A driven sprocket 15 is mounted on the under surface of the supporting plate 6 by means of a movable bracket 16 opposite to the driving sprocket 14 with the supporting shaft therebetween, the drive sprocket 15 being rotatable and position-adjustable. A pair of linking shafts 17 are rotatably and position-adjustably supported to the supporting plate 6 by means of a movable bracket 18, the linking shafts 17 being interposed between the driving sprocket 14 and the driven sprocket 15, the linking shafts 17 being engaged with the respective movable brackets 18. The lower end of each linking shaft 17 is fixed to a linking sprocket 19.

An endless first chain 20 is engaged between the driving sprocket 14 and the follower sprocket 15 of the course changing unit 1 disposed in the vicinity thereof, and is spread out along the intermediate rail 10 by means of both a plurality of guiding sprockets 21 disposed on the under surface of the supporting plate 6 and a plurality of chain guides 22 provided on the metal fittings 9. An endless second chain 23 is engaged with each linking sprocket 19, and is spread out along the station rail 11 by means of both a plurality of guiding sprockets 24 disposed on the under surface of the supporting plate 6 and a plurality of chain guides (not shown, similar to the chain guides 22) disposed on each metal fittings 9.

A chain driving motor 26 is mounted on the supporting plate 6 of the course changing unit 1 with a supporting leg 27. A motor shaft 26a is fixed with a driving pulley 28. A follower pulley 29 is fixed at the upper end of the rotating shaft 12. Between the follower pulley 29 and the driving pulley 28, a timing belt 30 is engaged. Three linking pulleys 31 are fixed at the midway of the rotating shaft 12 and at the top end of the linking shaft 17, respectively. These linking pulleys 31 are meshed with a timing belt 32. A pair of tension pulleys 33 rotatably supported on the supporting plate 6 apply a certain amount of tension to the timing belt 32.

As the chain driving motor 26 revolves, the rotational force is transmitted through the driving pulley 28, the timing belt 30, and the follower pulley 29, the rotating shaft 12 is rotated counterclockwise in FIG. 3, the first chain 20 being moved through the driving sprocket 14 in the counterclockwise direction. In addition, as the rotating shaft 12 rotates, both of the linking shafts 17 are rotated counterclockwise by way of the linking pulleys 31 and the timing belt 32, and both the second chains 23 are fed by means of the linking sprocket 19 in the same direction. Thus, as shown by the arrows of FIG. 2, the feeding directions on the pair of intermediate rails 10 between the course changing 1 become reverse of each other and the feeding direction on each station rail 11 becomes counterclockwise.

Figure 7:
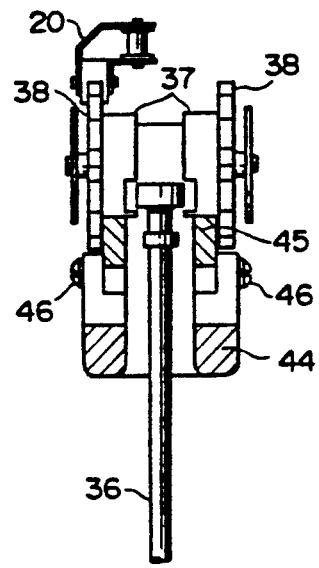
FIG. 7 is a partial sectional view taken from line C—C of FIG. 5.

As shown in FIGS. 3, 5, and 7, a hanger 36 as a carrier member is movably connected with the hanger rail 8 through a pair of rotatable rollers 37 so as to enable a workpiece such as a sewing product to be hung. A pair of engaging rings 38 having a plurality of engaging protrusions 38a on the outer periphery thereof are rotatably supported on the hanger 36. The rotation of the engaging rings 38 is neutrally restrained by a well-known frictional means (not shown). With the engaging protrusions 38a of the engaging rings 38 being engaged with the first chain 20 and the second chain 23, the first chain 20 and the second chain 23 are fed and thereby the hanger 36 is conveyed along the intermediate rail 10 or the station rail 11.

Figure 2:
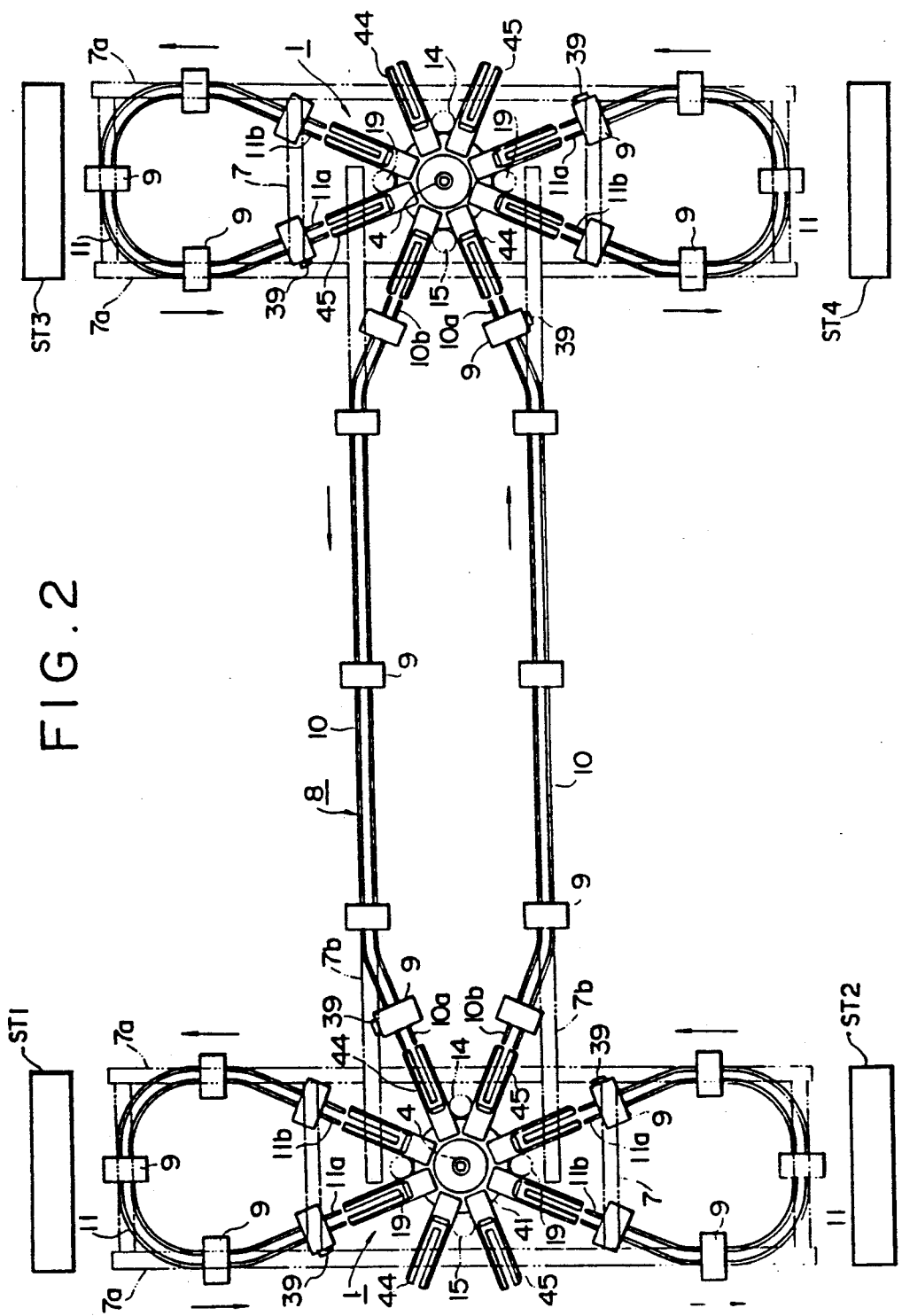
FIG. 2 is a partial plan view showing a hanger conveyer system embodying the present invention.

As shown in FIG. 2, hanger detection units 39 are provided on the metal fittings 9 of the receiving sections 10a and 11a of the intermediate rail 10 and the station rail 11. When the hanger 36 is conveyed to the position of the hanger detection unit 39 along the intermediate rail 10 or the station rail 11, according to a well-known method, a stopper (not shown) contacts the hanger 36 and thereby the transportation of the hanger 36 is temporarily stopped and a hanger identification code (not shown) on the hanger 36 is read by the hanger detection unit 39. While the hanger 36 stops, the chains 20 and 23 are continuously fed, however, the engaging rings 38 are idly rotated by the chains 20, 23 against the operation of the frictional means.

As shown in FIGS. 2, 3, 5, and 6, a rotating member 41 is rotatably supported to the supporting shaft 4 of the course changing unit 1 through a radial bearing 42. Between the lower end of the rotating member 41 and the mounting table 5, a thrust bearing 43 is provided. A plurality of course changing arms 44 (eight arms in this embodiment) radially disposed are outwardly spread out so that they face the receiving sections 10a and 11a and the sending sections 10b and 11b of the intermediate rail 10 and the station rail 11 at intervals of certain angles on the outer periphery of the rotating member 41

(at intervals of 45 degrees in this embodiment), respectively. The course changing arms 44 are spread out as far as to the positions overlapping the feeding range of the first chain 20 or the second chain 23.

A rocking rail 45 is pivoted at the end of each course changing arm 44 by a shaft 46, the inner end thereof forming an engaging protrusion 45a. As the left hand side one in FIG. 5, the rocking rail 45 is neutrally held inclined by the dead weight thereof. When the hanger 36 is received by the course changing arm 44 from the receiving sections 10a or 11a of the intermediate rail 10 or the station rail 11 by means of the first chain 20 or the second chain 23, the hanger 36 is lowered along the rocking rail 45 to the position engaged with the engaging protrusion 45a. Thus, the engagement of the engaging ring 38 with the first chain 20 or the second chain 23 is released.

As shown in FIGS. 3 to 6, a servo motor 47, which is forwardly and backwardly rotatable, is mounted on the supporting plate 6 as a drive means for driving the arms to rotate, a driving pulley 48 is secured to a motor shaft 47a. A follower pulley 49 which is engaged with the supporting shaft 4 is fixed on the upper surface of the rotating member 41. A timing belt 50 is engaged between the follower pulley 49 and the driving pulley 48. The servo motor 47 is rotated forwardly or backwardly so that the hanger 36 is transferred to a desired working station based upon the detection result of the hanger detection unit 39. When the servo motor 47 is driven, the rotating member 41 is rotated by means of the driving pulley 48, the timing belt 50, and the follower pulley 49 forwardly or backwardly for 45 degrees or for a predetermined angle comprising 45 degrees multiplied by a certain integer. Thus, the course changing arm 44 which supports the hanger 36 is rockingly positioned so that it is opposed to the sending section 10b or 11b of the intermediate rail 10 or the station rail 11.

As shown in FIGS. 3 and 5, a plurality of push-up cylinders 51 are mounted on the mounting table 5 by means of a supporting plate 52 below respective course changing arms 44. At the upper end of a piston rod 51a, a push-up member 53 capable of engaging with the rocking rail 45 which is arranged over the course changing arm 44 is provided. The push-up cylinder 51 is connected to a control circuit 61 (refer to FIG. 9). The control circuit 61 causes the piston rod 51a of the push-up cylinder 51 to be inserted in its neutral position. When the rotation of the rotating member 41 is completed, the control circuit 61 causes the piston rod 51a to be protruded. In addition, as shown in FIG. 5, when the push-up member 53 is protruded from the push-up cylinder 51, the rocking rail 45 supporting the hanger 36 is rockingly moved from the inclined state to the horizontal state and thereby the engaging ring 38 of the hanger 36 is engaged with the first chain 20 or the second chain 23.

Figure 8:
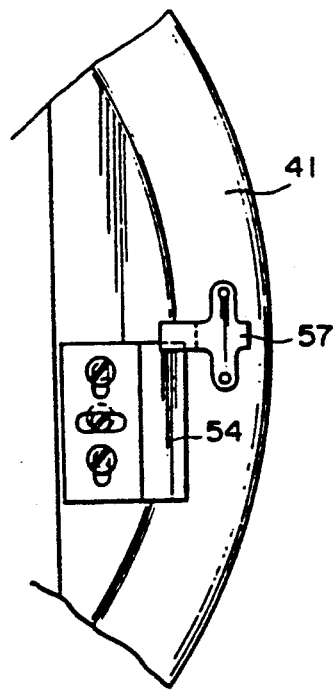
FIG. 8 is a partial sectional view taken from line D—D of FIG. 5.

As shown in FIGS. 5 and 8, a detected member 54 is provided on the lower surface of the rotating member 41 at a position corresponding to each course changing arm 44. A detector 57 is mounted on the supporting plate 52 at the position corresponding to the detected member 54. When the detector 57 detects the end portion of the detected member 54, the position of the rotating member 41 supporting the plurality of course changing arm 44 is detected. The control circuit 61 controls the servo motor 47 based upon the detection signal of the detected member 54 from the detector 57 in a feed-back manner. When the detected member 54 is detected, the course changing arm 44 is located opposed to the receiving section 10a or 11a and the sending section 10b or 11b of the intermediate rail 10 or the station rail 11.

In the hanger conveyer system according to the present invention, when the chain driving motor 26 provided in each course changing unit 1 for driving the chain is rotated, as shown in FIGS. 4 and 5, the first chain 20 is fed counterclockwise in FIG. 4 along the immediate rail 10 by means of the driving pulley 28, the timing belt 30, and so forth. As the rotating shaft 12 is rotated, the second chain 23 is fed along the station rail 11 in the same direction by means of the linking pulleys 31, the timing belt 32, and so forth.

Thus, the hanger 36 carrying a workpiece is supported on the intermediate rail 10 or the station rail 11 and conveyed in the direction shown by the arrows in FIG. 2 while the engaging ring 38 is being engaged with the first chain 20 or the second chain 23. When the hanger 36 is conveyed to a position corresponding to the hanger detection unit 39, a stopper (not shown) is protruded on the transporting route of the hanger 36. Thereby, the transporting of the hanger 36 is temporarily stopped and a hanger identification code on the hanger 36 is read by the hanger detection unit 39.

After the reading operation takes place, the stopper is retracted and the transparting of the hanger 36 is restarted. As shown in FIG. 5, the hanger 36 is sent to the course changing arm 44 from the receiving section 10a or 11a of the intermediate rail 10 or the station rail 11 and then the hanger 36 is directed to the lower position where the hanger 36 is engaged with the engaging protrusion 45a on the rocking rail 45 in the inclined state by its dead weight. Thus, the engaging ring 38 is disengaged from the first chain 20 or the second chain 23 and the hanger 36 is statically held on the rocking rail 45. In this state, based upon the detection result of the hanger detection unit 39, the rotating member 41 is rotated forwardly or backwardly for a certain angle by the servo motor 47 through the driving pulley 48 and so forth. Thus, the course changing arm 44 supporting the hanger 36 is rotated in the position opposite to the sending section 10b or 11b of the intermediate rail 10 or the station rail 11.

Then, a push-up member 53 corresponding to the course changing arm 44 which supports the hanger 36 is raised from the push-up cylinder 51. Thus, the rocking arm 45 is rotated from the inclined state to the horizontal state and the hanger 36 is raised up. Consequently, the engaging ring 38 is engaged with the first chain 20 or the second chain 23. As the first chain 20 and the second chain 23 are being fed, the hanger 36 is sent to the sending section 10b or 11b of the intermediate rail 10 or the station rail 11 from the course changing arm 44 and then transferred to the subsequent course changing unit 1 along the intermediate rail 10 or to a specified working station provided along the station rail 11.

When the hanger 36 is located at the position corresponding to the working station on the station rail 11, the stopper which consists of well-known mechanism is protruded on the station rail 11 and the transportation of the hanger 36 is stopped. A worker, for example, a sewing worker or the like removes a workpiece such as sewing product from the hanger 36, sews it, and returns it to the hanger 36. After that, the stopper is retracted and the transporting of the hanger 36 is started again.

According to the hanger conveyer system of the present invention, the system is structured by a set of the course changing unit 1, the intermediate rail 10 disposed between the course changing unit 1 and another course changing unit 1, and the station rail 11 disposed around the course changing unit 1. Thus, the layout of the system can be freely made by installing the required number of course changing units 1, the intermediate rails 10 being provided between the course changing units 1, the station rails 11 being arbitrarily disposed in the vicinity of the course changing unit 1.

Figure 9:
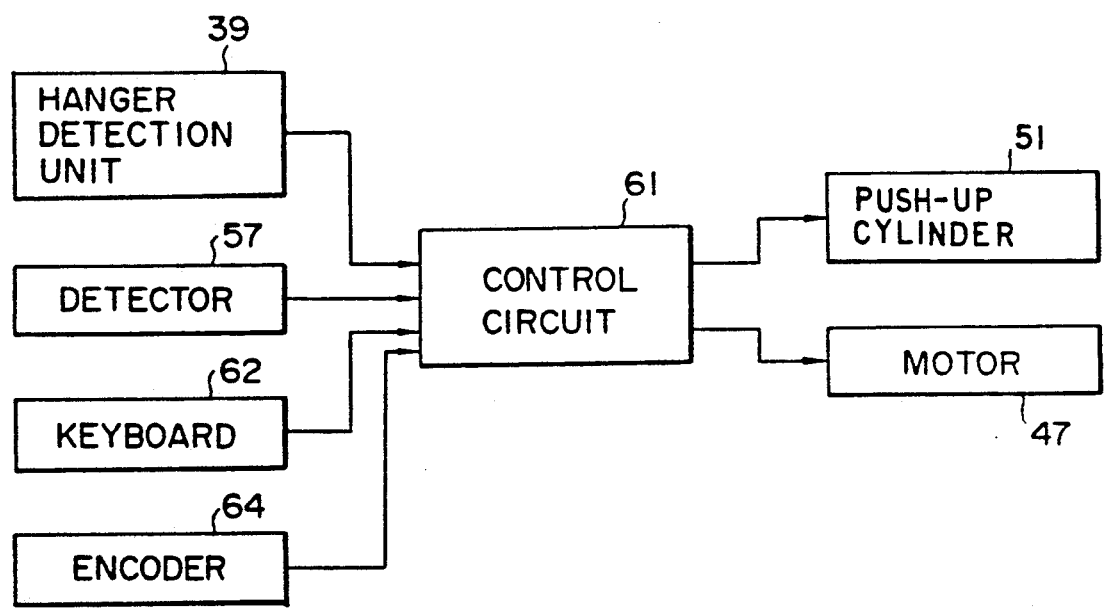
FIG. 9 is a block diagram showing a control system of the conveyer system embodying the present invention.

FIG. 9 is a block diagram showing a control system of the conveyer system embodying the present invention. In FIG. 9, an encoder 64 which is mounted on the motor 47 detects the amount of rotation of the motor 47, that is, the rotation angle of the course changing arm 44. A keyboard 62 is used for operating the entire system. The control circuit 61 controls the operation of the push-up cylinder 51 and the motor 47 base on the output of the hanger detection unit 39, the detector 57, the keyboard 62 and the encoder 64.

Figure 10:
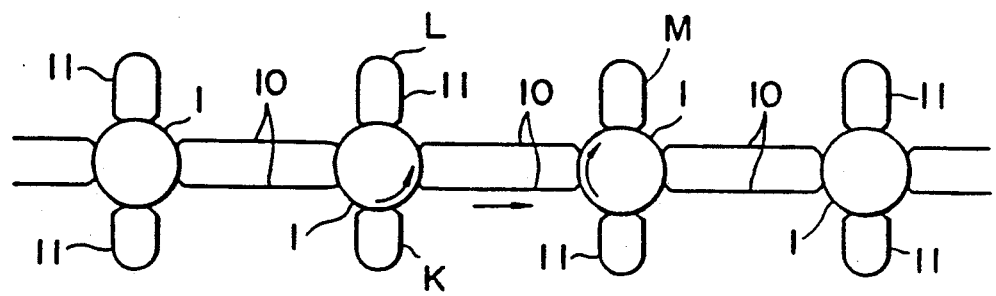
FIGS. 10 and 11 are plan views outlining the hanger conveyer system of the embodiment.

FIG. 10 shows an example of a layout of the conveyer system, in which the course changing units 1 are arranged in a straight row, a pair of intermediate rails 10 being positioned between two course changing units 1.

Figure 11:
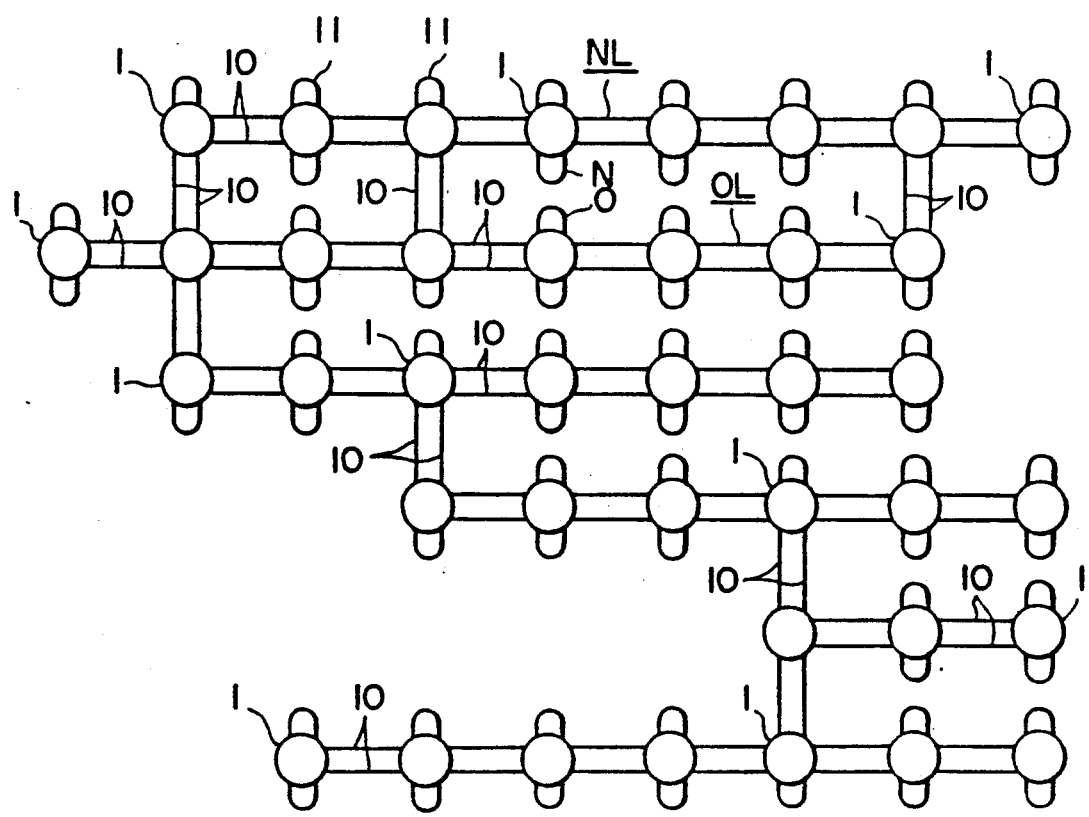

FIG. 11 shows another example of a layout of the conveyer system. In FIG. 11, a plurality of course changing units 1 are arranged lengthwise and breadthwise at certain distances, the intermediate rails 10 being provided between the two course changing units 1 which are adjacently disposed in one direction. Further, the intermediate rails 10 are provided between desired two course changing units 1 which are adjacently disposed in the other direction. Thus, the station rails 11 provided in the vicinity of each course changing units 1 for working stations ST1, ST2, ... are networked. The system can be freely laid out in a straight shape or in a network shape. In this case, since the distance between the receiving section 10a or 11a and the sending section 10b or 11b of the intermediate rail 10 or the station rail 11 accords with that between the course changing arms 44, the number of the intermediate rails 10 and the station rails 11 can be increased, decreased, or changed without any difficulties, therefore the layout of the system can be freely made.

In addition, by increasing or decreasing the number of the course changing units 1 and that of the intermediate rails 10 and the station rails 11 which associate therewith, the layout can be flexibly changed and/or expanded. In other words, since the entire system is composed of a combination of sets described above, as opposed to the conventional structure, any complicated works such as cutting out and addition of lines are avoidable. The works required in the system are to install or remove the post 3 of the course changing unit 1 on or from the ground and to change the positions and the number of the intermediate rails 10 and the station rails 11. In addition, unlike the conventional system shown in FIG. 1, since each set of the system independently works, even while the system is under construction, it is not necessary to stop the other sets of the system. In other words, since the layout of the system can be easily changed and/or expanded without stopping the entire system, a loss of excessive facility construction for future expansion can be prevented.

In addition, in the hanger conveyer system according to the present invention, since the hanger 36 which hangs a workpiece such as a sewing product is directed to a specified direction in the course changing unit 1, it is possible to convey the hanger 36 on the shortest route at a short time. In other words, when the hanger 36 is conveyed from the position K to the position L shown in FIG. 10, the hanger 36 can be conveyed to the position L by only rotating the course changing unit 1 rather than through a roundabout way as shown by the arrow F in FIG. 1. When the hanger 36 is conveyed from the position K to the position M, the course changing unit 1 corresponding to the position K is rotated, the hanger 36 being placed at the portion where the feeding direction of the intermediate rail 10 is the position K, the course changing unit 1 corresponding to the position M to which the hanger 36 is fed being rotated to the position M. In addition, in FIG. 11, when the hanger is conveyed from the position N to the position O, it can be conveyed on the shortest route through the close intermediate rail 10 connected between the line NL of the position N and the line OL of the position O. Thus, by properly selecting a combination of the intermediate rail 10 and the station rail 11, the hanger 36 can be conveyed to a destination in a short time.

The present invention does not limit to the structure described above. It will be readily apparent to those skilled in the art that various modifications may be made and other embodiments implemented without departing from the scope of the invention concept. For example, the carrier member may be structured by a supporting member for supporting a workpiece which differs from the hanger for hanging it.

Since the present invention is structured as described above, the layout of the conveyer system can be made straightly or in a network shape with flexibility against its change and expansion. In addition, the carrier member which hangs a workpiece can be transferred between two working stations on the shortest route at a short time and thereby excellent effects can be obtained.

What is claimed is:

1. A conveyor system for conveying a carrier member which supports a workpiece among working stations, comprising:
    a plurality of course changing means for changing a conveying course of said carrier member;
    a plurality of pairs of intermediate tracks, each of said pairs of intermediate tracks being disposed between adjacent two of said course changing means, one intermediate track of each of said pairs of intermediate tracks guiding said carrier member in one direction and the other intermediate track of each of said pairs of intermediate tracks guiding said carrier member in a direction opposite said one direction, each of said pairs of intermediate tracks having a sending portion at one end thereof and a receiving portion at another end thereof, said carrier member being transferred from a course changing means to the sending portion of each of said pairs of intermediate tracks and said carrier member being transferred from a receiving portion of each of said pairs of intermediate tracks to said course changing means;
    first moving means for moving a carrier member along said pairs of intermediate tracks;
    a plurality of station tracks guiding said carrier, each of said station tracks being disposed between a working station and a course changing means, said station tracks each having a sending portion at one end thereof and a receiving portion at another end thereof, said carrier member being transferred from said course changing means to said sending portion of said station tracks, and said carrier member being transferred from said receiving portion of said station tracks to said course changing means;

second moving means for moving said carrier member along said station tracks;

a rotating member rotatably supported by said course changing means;

at least eight support members radially and symmetrically mounted on said rotating member, each of said support members corresponding to one of said sending portions and receiving portions of one of said pair of intermediate tracks and one of said station tracks, each of said support members receiving said carrier member when transferred from its corresponding receiving portion of said one of said pairs of intermediate tracks and said one of said station tracks and sending said carrier member to said sending portion of said one of said pairs of intermediate tracks and said one of said station tracks;

means for pivotally supporting said support members on said rotating member between a first position and a second position; and rotating means for rotating said rotating member for changing the orientation of a carrier member received by a support member.

2. The conveyor system according to claim 1 wherein said course changing means further comprises switching means for switching the position of said support member into one of said first position and said second positions whereby said support member sends said carrier member out when said support member is switched into said first position by said switching means and said support member receives said carrier member when said support member is switched into said second position.

3. The conveyor system according to claim 1 wherein said means for pivotally supporting said support members rockably supports said support members.

4. The conveyor system according to claim 1, wherein said first and second moving means comprise first and second endless chains continuously fed in predetermined directions, respectively, and wherein said carrier member comprises engaging means for engaging with one of said first and second chain members.

5. The conveyor system according to claim 4 wherein said support members are rockably supported by said pivotally supporting means between first and second positions, said engaging member of said carrier member supported on said support member is disengaged from one of said first and second and second endless chains when said support member is at its second position, while said engaging member of said carrier member supported on said support member is engaged with one of said first and second chains when said support member is at its first position, said support member being neutrally located at said second position.

6. The conveyer system according to claim 5, wherein said course changing means comprises a plurality of shifting means for locating said support members in to said first position.

7. The conveyor system according to claim 2, wherein said course changing means further comprises position detection means for detecting a rotational position of said rotating member.

8. The conveyor system according to claim 7 which further comprises control means for controlling said switching means to locate said support member at said first position based upon a detection of said rotational position by said detection means.

9. The conveyor system according to claim 8, which further comprises detection means for detecting one of said working stations where said carrier member is to be transferred, and wherein said control means rotates said rotating member in order to locate said support member carrying said carrier member to be opposed to one of said sending portions based on the detection by said detection means.

10. The conveyer system according to claim 9, wherein said detection means comprises:
indication member provided on said carrier member for indicating a station where said carrier member is to be transferred; and
reading means provided at each of said receiving portions for reading said indication member in order to detect a station where said carrier member is to be transferred.

* * * * *